United States Patent
Marchini et al.

(10) Patent No.: US 9,701,082 B2
(45) Date of Patent: Jul. 11, 2017

(54) PROCESS AND PLANT FOR BUILDING TYRES FOR VEHICLE WHEELS

(75) Inventors: Maurizio Marchini, Milan (IT); Gianni Mancini, Milan (IT); Christian De Col, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 809 days.

(21) Appl. No.: 13/993,156

(22) PCT Filed: Nov. 24, 2011

(86) PCT No.: PCT/IB2011/055272
§ 371 (c)(1),
(2), (4) Date: Jun. 11, 2013

(87) PCT Pub. No.: WO2012/085713
PCT Pub. Date: Jun. 28, 2012

(65) Prior Publication Data
US 2013/0264003 A1  Oct. 10, 2013

(30) Foreign Application Priority Data
Dec. 23, 2010  (IT) .............................. MI2010A2377

(51) Int. Cl.
*B29D 30/24* (2006.01)
*B29D 30/70* (2006.01)
*B29D 30/30* (2006.01)

(52) U.S. Cl.
CPC .......... *B29D 30/30* (2013.01); *B29D 30/242* (2013.01); *B29D 30/247* (2013.01); *B29D 30/70* (2013.01); *B29D 2030/705* (2013.01)

(58) Field of Classification Search
CPC ........ B29D 2030/241; B29D 2030/265; B29D 2030/2657; B29D 2030/705; B29D 30/242; B29D 30/3057; B29D 30/70
See application file for complete search history.

(56) References Cited

U.S. PATENT DOCUMENTS

| 4,555,287 A | 11/1985 | Goodfellow |
| 4,673,457 A | 6/1987 | Goodfellow |

(Continued)

FOREIGN PATENT DOCUMENTS

| CN | 101456229 A | 6/2009 |
| DE | 10 2008 032 382 B3 | 12/2009 |

(Continued)

OTHER PUBLICATIONS

International Search Report from the European Patent Office for International Application No. PCT/IB2011/055272, mailing date Apr. 23, 2012.

(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

During building of tires, at least one first forming drum is employed which has a deposition surface and includes sectors radially movable relative to a geometric rotation axis, and circumferentially distributed one after the other. A plurality of strip-like elements is deposited in circumferential side by side relationship on the deposition surface set in the first deposition configuration, to form at least one component of at least one first crown structure. Setting of the deposition surface includes the actions of radially moving the sectors to give the deposition surface a predetermined diameter and carry out a relative movement between a central portion and axially external end portions of each sector to shape the deposition surface according to a predetermined curvature outline.

14 Claims, 7 Drawing Sheets

(56) References Cited

U.S. PATENT DOCUMENTS

| | | | |
|---|---|---|---|
| 2006/0086451 A1 | 4/2006 | Nakata | |
| 2007/0095481 A1* | 5/2007 | Graaf .................. | B29D 30/242 |
| | | | 156/414 |
| 2009/0155399 A1 | 6/2009 | Fujieda | |
| 2010/0276067 A1* | 11/2010 | Marchini ............ | B29D 30/005 |
| | | | 156/111 |
| 2011/0315323 A1* | 12/2011 | Lipsa .................. | B29D 30/242 |
| | | | 156/414 |

FOREIGN PATENT DOCUMENTS

| | | |
|---|---|---|
| EP | 1 570 978 A1 | 9/2005 |
| FR | 2 548 081 A1 | 1/1985 |
| FR | 2939711 A * | 6/2010 |
| JP | 46-4892 | 2/1971 |
| JP | 2007-185888 A * | 7/2007 |
| WO | WO 2005/097479 A1 | 10/2005 |
| WO | WO 2008/152453 A1 | 2/2008 |
| WO | WO 2009/058296 A1 | 5/2009 |
| WO | WO 2010/064077 A1 | 6/2010 |

OTHER PUBLICATIONS

Written Opinion of the International Searching Authority from the European Patent Office for International Application PCT/IB2011/055272, mailing date Apr. 23, 2012.

Notification of the First Office Action and Search Report issued Apr. 3, 2015 by the State Intellectual Property Office of the People's Republic of China in counterpart Chinese Application No. CN 201180059743.0.

EPO Communication regarding copending EP Application No. 11 813 391.7, dated May 24, 2016.

\* cited by examiner

US 9,701,082 B2

PROCESS AND PLANT FOR BUILDING TYRES FOR VEHICLE WHEELS

CROSS REFERENCE TO RELATED APPLICATIONS

This application is a national phase application based on PCT/IB2011/055272, filed Nov. 24, 2011, which claims the priority of Italian Patent Application No. MI2010A002377, filed Dec. 23, 2010, and the benefit of U.S. Provisional Application No. 61/429,304, filed Jan. 3, 2011, the content of each application being incorporated herein by reference.

BACKGROUND OF THE INVENTION

Field of the Invention

The present invention relates to a process and a plant for building tyres for vehicle wheels. More specifically, the invention is particularly addressed to manufacture of crown structures, in particular in production contexts in which building of the tyre takes place by assembling elementary semifinished products such as rubberised textile or metallic cords, strip-like elements formed starting from a continuous ribbon-like element cut to size and comprising a plurality of textile or metallic cords disposes parallel and adjacent to each other, and/or continuous elongated elements of elastomeric material circumferentially wound into a plurality of mutually adjacent turns.

Description of the Related

A tyre for vehicle wheels generally comprises a carcass structure including at least one carcass ply having respectively opposite end flaps in engagement with respective annular anchoring structures, integrated into the regions usually identified as "beads", defining the radially internal circumferential tyre edges.

Associated with the carcass structure is a belt structure comprising one or more belt layers, placed in radially superposed relationship relative to each other and to the carcass ply, provided with textile or metallic reinforcing cords having crossed orientation and/or substantially parallel to the circumferential extension direction of the tyre. Applied at a radially external position to the belt layers is a tread band, made of elastomeric material too, like other semifinished products constituting the tyre.

In addition, respective sidewalls of elastomeric material are applied at an axially external position to the side surfaces of the carcass structure, each extending from one of the side edges of the tread band until close to the respective annular anchoring structure to the beads. In tyres of the "tubeless" type, an airtight coating layer, usually referred to as "liner" covers the inner surfaces of the tyre.

To the aims of the present specification and the following claims, by "crown structure" of a tyre it is intended at least one belt structure having at least one belt layer or strip. More preferably, the crown structure comprises a belt structure having at least one belt layer or strip and a tread band.

In the specification and in the following claims the term "component" is understood as indicating any part of the tyre that is suitable to perform a function, or a portion thereof. Therefore, defined as components are for example the liner, underliner, abrasion-proof element, bead core, bead filler, carcass ply, belt strip, belt under-layer, tread under-layer, sidewall inserts, sidewalls, tread band, reinforcing inserts.

In the present specification and in the following claims the term "strip-like element" is understood as indicating an elongated element of elastomeric material of flattened shape and cut to size, including at least one, preferably at least two textile or metallic reinforcing cords that are parallel to each other and to the longitudinal axis of the elongated element itself.

SUMMARY OF THE INVENTION

The Applicant has observed that it is possible to provide a forming drum comprising a plurality of supporting elements having stiff surfaces for the tyre components and disposed along the drum circumference, in which the support elements, considered in a diametrical section plane containing the geometric axis of the drum, comprise central supporting portions and lateral supporting portions fastened thereto. The central supporting portions are movable by means of first actuating devices between a first position at which the respective supporting elements form a supporting surface parallel to the geometric axis of the drum, and at least one second position at which the supporting elements form a convex surface. The first actuating devices are connected to the central portions of the supporting elements for at least keeping them parallel to the geometric axis at least in the second position.

The Applicant has also observed that on a forming drum externally having a substantially cylindrical deposition surface, a plurality of strip-like elements can be applied, which are disposed in mutually approached relationship so as to form at least one first annular reinforcing layer on the forming drum itself set to a first work diameter in which each of the applied strip-like elements on the deposition surface subtends an arc of a circumference the width of which is equal to a submultiple integer of the overall circumferential extension of the deposition surface. Adjusting devices operating on the forming drum will subsequently expand it to a second work diameter greater than the first work diameter, while maintaining the deposition surface thereof substantially cylindrical. The Applicant has also observed that the forming drum may comprise consecutive circumferential sectors radially movable upon command of the adjusting devices. Each of the circumferential sectors has comb-shaped end portions that are each operatively engaged in a comb-shaped end portion complementary thereto carried by a circumferentially adjacent circumferential sector.

The Applicant has noticed that basically each tyre size requires a specific forming drum and in particular a specific auxiliary drum for forming one or more belt layers or a crown structure.

In fact, it is the Applicant's opinion that it is desirable for the belt layers and/or other components of the crown structure to be made according to a transverse outline which is as much as possible close to or coincident with the outline that the components must have in the finished tyre.

While having verified that it is possible to use the same type of forming drum for two or more tyre sizes, the Applicant has however noticed that a process and apparatus as above described would require management of many forming drums for which a specific storehouse is necessary.

The Applicant has felt the necessity to optimise management of the forming drums without being obliged to provide a specific storehouse of big sizes for forming drums having shapes and/or sizes different from each other, while at the same time ensuring the availability of a forming drum of appropriate sizes and shape for each type of tyre to be produced.

The Applicant has found that by providing a forming drum in which the curvature outline and therefore the deposition surface thereof can be configured in shape and sizes as a function of the size of the tyre to be produced, the warehouse for the forming drums can be eliminated or greatly reduced.

More particularly, in accordance with a first aspect, the invention relates to a process for building tyres for vehicle wheels, comprising:
making carcass structures;
making crown structures;
associating each carcass structure with each crown structure;
wherein making said crown structures comprises:
providing at least one first forming drum having a deposition surface and comprising sectors radially movable relative to a geometric rotation axis, and circumferentially distributed one after the other;
setting the deposition surface in a first deposition configuration;
depositing strip-like elements in circumferential side by side relationship on the deposition surface set in the first deposition configuration, so as to form at least one component of at least one first crown structure;
wherein the action of setting said deposition surface comprises:
radially moving said sectors to give the deposition surface a predetermined diameter;
carrying out a relative movement between a central portion and axially external end portions of each sector, to shape the deposition surface into a predetermined curvature outline.

The Applicant thinks that each component of the crown structure formed on the deposition surface already set to the desired deposition configuration, can advantageously have geometric features substantially coincident with those required in the finished tyre. The Applicant has further ascertained that the components of the crown structure as obtained will not necessarily have to be submitted to important deformation actions for adapting the shape thereof to the design parameters during the work steps following their manufacture. Thus important qualitative improvements can be obtained in the final product. In addition, as the Applicant ascertained, a greater production flexibility can be advantageously achieved, since a wide variety of sizes and curvature outlines obtained using the same forming drum is made available, while at the same time being limited the space not directly concerned with production, like that for storing the forming drums, and being reduced the manufacturing and management costs for a great number of forming drums.

In accordance with a second aspect, the invention relates to a plant for building tyres for vehicle wheels, comprising:
a carcass-structure building line;
a crown-structure building line;
an assembling station for coupling each carcass structure to each crown structure;
wherein the crown-structure building line comprises:
at least one first forming drum including sectors that are radially movable relative to a geometric rotation axis, each of them having at least one central portion and axially external end portions that are radially movable relative to the central portion, wherein said sectors are circumferentially distributed one after the other so as to define a deposition surface;
devices for setting the deposition surface in at least one deposition configuration;
devices for depositing strip-like elements in circumferential side by side relationship on the deposition surface set in said deposition configuration, so as to form at least one component of at least one crown structure;
wherein said devices for setting the deposition surface comprise:
radial-movement devices for moving the sectors so as to give the deposition surface a predetermined diameter;
relative-movement devices for movement between the end portions and central portion of each sector relative to the geometric rotation axis, in order to shape the deposition surface into a predetermined curvature outline.

This plant helps in making available a wide variety of curvature outlines and diametrical sizes of the deposition surface on the same forming drum.

The present invention, in accordance with one of said aspects, can have one or more of the preferred features hereinafter described.

In accordance with a possible embodiment, provision is made for: coupling said at least one first forming drum with a handling device adapted to be activated for setting the deposition surface to the first deposition configuration; decoupling said at least one first forming drum from the handling device before completing formation of the first crown structure.

Also preferably provided is the action of coupling said at least one first forming drum again to the handling device, for setting the deposition surface to a second deposition configuration.

Decoupling of the forming drum makes the handling device available for other operations.

For instance, the handling device decoupled from said at least one first forming drum can be coupled to at least one second forming drum. Coupling of the handling device to said at least one second forming drum can for example enable setting of the deposition surface and/or execution of other processing operations on the second forming drum itself.

Preferably, coupling of the handling device to said at least one second forming drum is carried out before coupling said at least one first forming drum again to the handling device.

Meanwhile, the decoupled forming drum can be submitted to other processing operations provided in the building cycle of the crown structure.

For instance, at least one additional component of the crown structure can be made on said at least one first forming drum decoupled from the handling device.

Also provided can be at least transfer of said at least one first forming drum from a first work location to at least one second work location.

At least one additional component of the crown structure can be made on said at least one first forming drum transferred to the second work location.

Provision is also preferably made for locking the deposition surface to the respective deposition configuration during transfer of said at least one first forming drum.

In particular flowing of different forming drums along the work locations can be such managed that the simultaneous processing of different crown structures can be carried out.

Transfer of said at least one first forming drum from the first work location to said at least one second work location is carried out by said handling device.

A structural simplification of the plants and a reduction in the processing times can be thus achieved.

Preferably, carrying out of said relative movement comprises: locking the central portion of each sector relative to the geometric rotation axis; moving the end portions of each sector relative to the geometric rotation axis.

Preferably, during said relative movement, the end portions of each sector are moved towards the geometric rotation axis.

Thus a convex curvature outline can be given to the deposition surface.

Radial movement of the sectors is preferably carried out through respective sliders carried by the end portions of each sector.

It is also preferably provided that the radial movement of the sectors be carried out by driving at least one spiral-shaped cam in rotation around said geometric rotation axis.

Thus a symmetric and timed movement of the end portions of each sector can be obtained.

In a preferred example of the invention the following actions are in addition carried out: removing said at least one component of at least one first crown structure from said at least one first forming drum; setting the deposition surface to a second deposition configuration; forming at least one component of at least one second crown structure on the deposition surface.

Preferably, said at least one component of said at least one first crown structure formed through deposition of strip-like elements in circumferential side by side relationship is a belt layer.

Preferably, at least one component of said at least one first crown structure is made on said at least one first forming drum decoupled from the handling device.

According to a preferred embodiment, at least one component of the crown structure is made on said at least one first forming drum transferred to said at least one second work location.

Preferably provided are central-portion locking devices, operating on the central portion of each sector so as to lock it to a predetermined work position selected from a plurality of positions included between a maximum-contraction position and a maximum-expansion position.

Also provided can be end-portion locking devices, operating on the end portions of each sector for locking them to a predetermined work position selected from a plurality of positions included between a maximum-contraction position and a minimum-contraction position relative to the corresponding central portion.

Said relative-movement devices can be preferably activated concurrently with activation of the central-portion locking devices.

Said radial-movement devices can be preferably activated concurrently with activation of the end-portion locking devices.

The devices for setting the deposition surface preferably comprise at least one handling device capable of being coupled in a removable manner to said at least one first forming drum.

More particularly, said handling device can be preferably operatively coupled to said radial-movement devices for determining activation thereof.

Said handling device can be operatively coupled to said relative-movement devices for determining activation thereof.

Preferably, said handling device can be operatively coupled to said central-portion locking devices for operating deactivation thereof.

Preferably, the handling device is movable between a first work location and at least one second work location for transfer of the forming drum between said first work location and said at least one second work location.

Preferably, the handling device comprises a robotized arm, preferably an anthropomorphous robotized arm.

In each sector, the end portions are preferably hinged on respective opposite ends of the central portion.

Each sector can further comprise intermediate portions each secured between one of the end portions and the central portion.

The radial-movement devices preferably comprise at least one spiral-shaped cam operatively engaging said sectors and drivable in rotation around the geometric axis to determine radial movement of the sectors.

Said spiral-shaped cam can be operatively in engagement with sliders, each carried by one of the end portions of one of said sectors.

Preferably the end portions of each sector are mutually interconnected by a bridge structure.

Preferably, said bridge structure carries the end-portion locking devices.

The central-portion locking devices preferably comprise first brakes drivable for unlocking the radial movement of the central portions.

More particular, each of said first brakes preferably operates between a rod radial to the respective sector and a first runner slidably guided relative to the rod.

The end-portion locking devices can comprise second brakes drivable for unlocking the radial movement of the end portions relative to the central portions.

More particularly, each of said second brakes operates between a rod radial to the respective sector and a second runner slidably guided relative to said rod.

Also preferably provided are devices for selecting the deposition configuration to be given to the deposition surface as a function of the type of tyre being processed.

The crown-structure building line preferably comprises a setting location provided for receiving said at least one first forming drum.

Said setting location comprises control devices that can be operatively coupled to said end-portion locking devices, and can be activated for unlocking the radial movement of the end portions relative to the central portions.

Further features and advantages will become more apparent from the detailed description of a preferred but not exclusive embodiment of a process and a plant for building tyres, in accordance with the present invention.

DETAILED DESCRIPTION OF THE DRAWINGS

This description will be set out hereinafter with reference to the accompanying drawings, given by way of non-limiting example, in which:

FIG. 1 diagrammatically shows a top view of a plant for building tyres produced in accordance with the present invention;

DETAILED DESCRIPTION OF THE INVENTION

Figure 1:
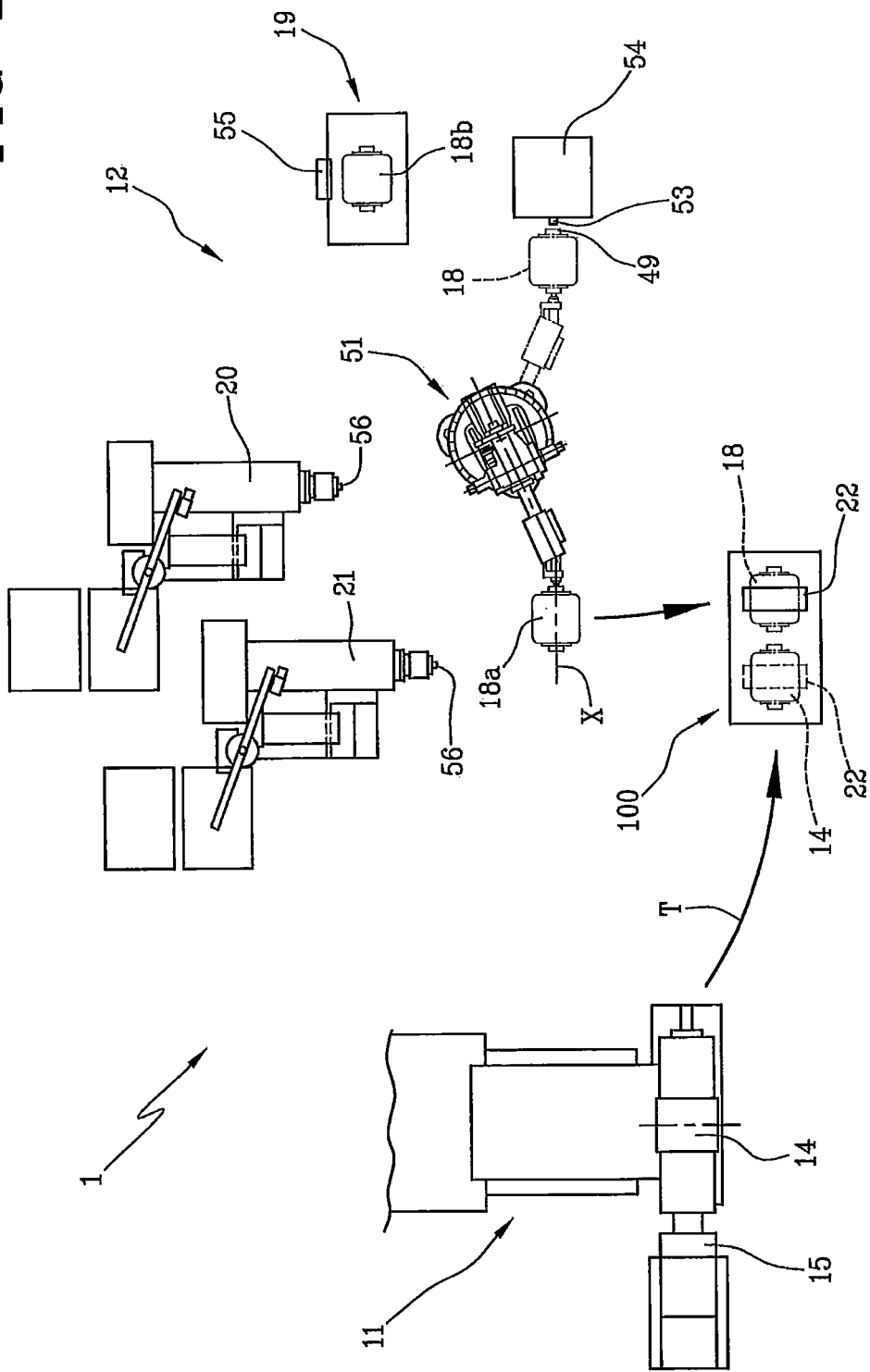
Figure 2:
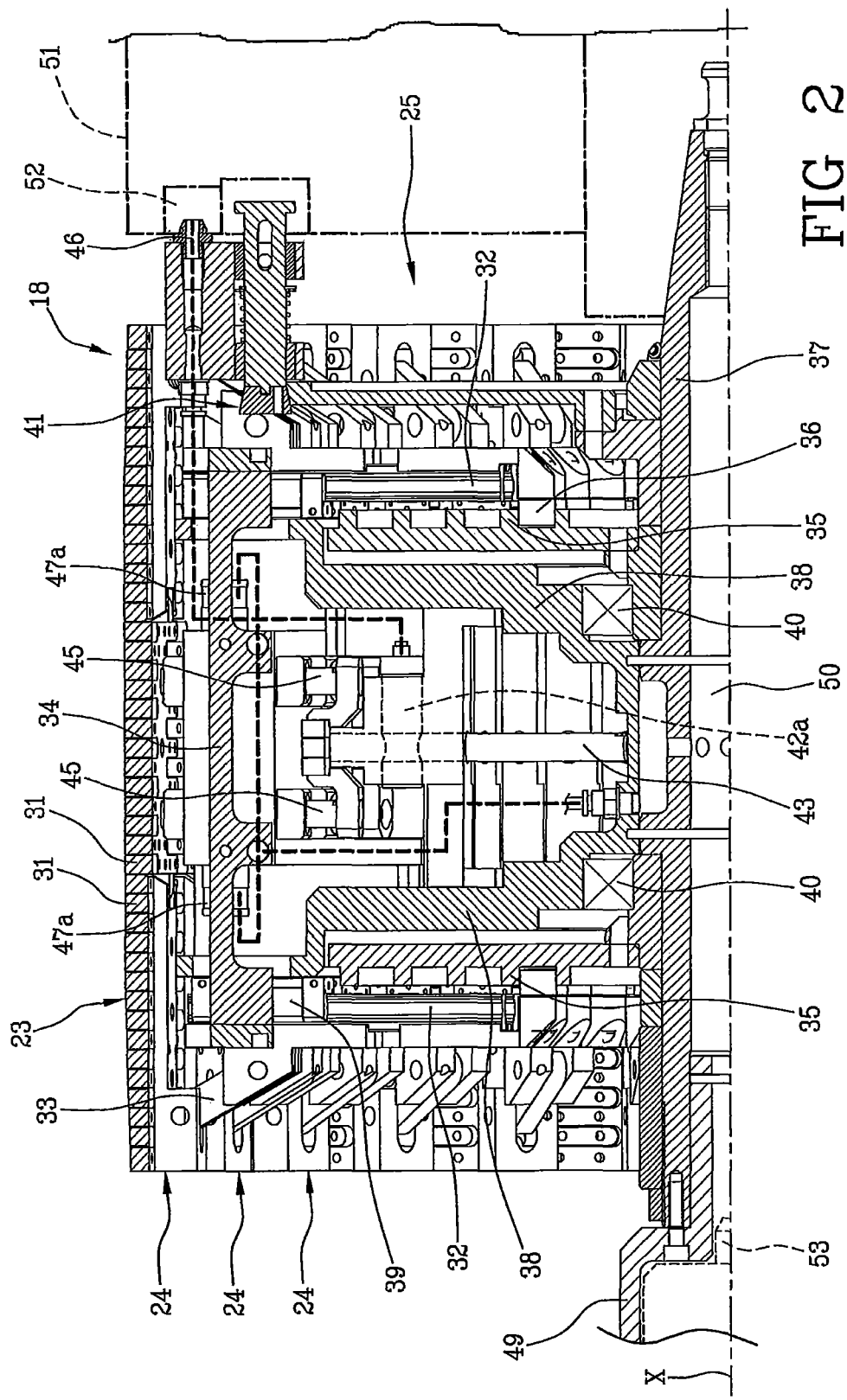
FIG. 2 shows a diametrical half-section of the forming drum.

With reference to the drawings, a plant for building tyres for vehicle wheels, provided for carrying into practice a process according to the invention has been generally identified by reference numeral 1.

Figure 7:
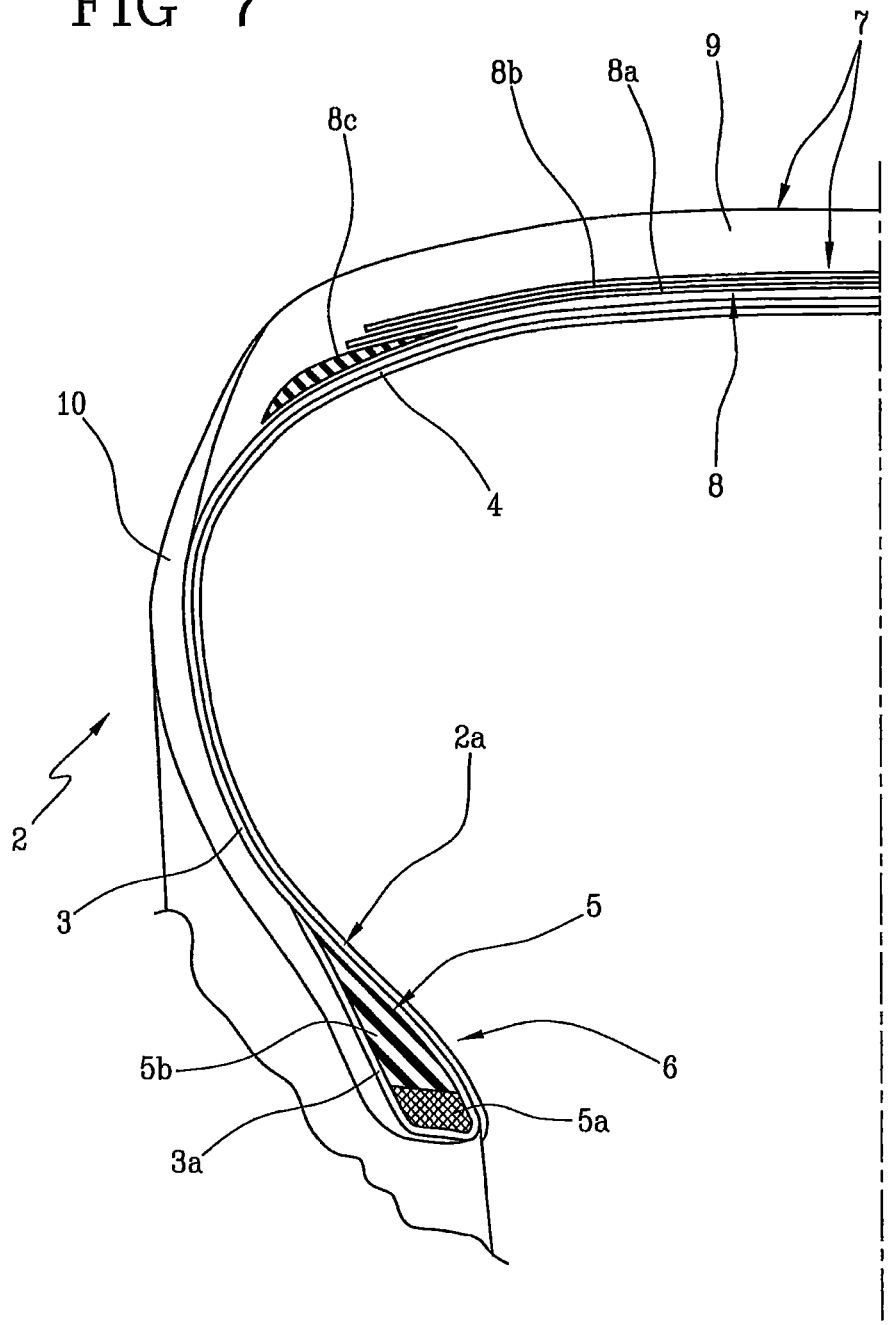
FIG. 7 is a fragmentary diametrical section of a tyre that can be manufactured by the process and plant in reference.

Plant 1 is intended for manufacturing tyres 2 (FIG. 7) essentially comprising a carcass structure 2a having at least one carcass ply 3. A layer of airtight elastomeric material or a so-called liner 4 can be applied to the inside of the carcass ply/plies 3. Two annular anchoring structures 5 each comprising a so called bead core 5a carrying an elastomeric filler 5b at a radially external position, are in engagement with respective end flaps 3a of the carcass ply or plies 3. The annular anchoring structures 5 are integrated in the vicinity of regions usually identified as "beads" 6, at which engagement between tyre 2 and a respective mounting rim usually takes place.

A crown structure 7 is circumferentially applied around the carcass ply/plies 3. The crown structure comprises a belt structure 8 having one or more belt layers 8a, 8b and preferably a tread band 9 circumferentially superposed on the belt structure 8.

So called "under-belt inserts" 8c can be associated with the belt structure 8 and they are each placed between the carcass ply/plies 3 and one of the axially opposite end edges of the belt structure 8. Alternatively or in addition to the under-belt inserts 8c, annular inserts of elastomeric material and/or comprising cords or other reinforcing elements can be radially superposed at least on the axially opposite end edges of the belt structure 8, and/or interposed between the belt layers 8a, 8b, at least at said end edges.

Two sidewalls 10 each extending from the corresponding bead 6 to a corresponding side edge of the tread band 9, are applied to the carcass ply/plies 3 at laterally opposite positions.

Plant 1 essentially comprises a carcass-structure building line 11, wherein the carcass structures 2a of the tyres under production are formed. The crown structures 7 are produced in a crown-structure building line, generally denoted at 12 in FIG. 1.

In an assembling station 100, operatively interposed between the carcass-structure building line 11 and the crown-structure building line 12 or operatively integrated into one of them, coupling of each carcass structure 2a to a respective crown structure 7 is carried out.

The carcass-structure building line 11 comprises a primary building drum 14, on which the carcass structure 2a of tyre 2 is preferably built and/or assembled. The primary drum 14 preferably is a building drum having a substantially cylindrical shape.

The primary drum 14 can be operatively supported by a mandrel 15, a robotized arm, or another device enabling it to be, if necessary, driven in rotation and/or suitably handled during application of the components of the carcass structure 2a at the building station 11.

More particularly, the primary drum 14 is adapted to first receive liner 4, if any, and subsequently the carcass ply or plies 3, so as to form a cylindrical sleeve on the opposite end flaps of which the annular anchoring structures 5 are afterwards fitted. Turning-up of the end flaps 3a of the carcass ply/plies 3 can be then carried out around the annular anchoring structures 5. Also provided may be application of at least one sidewall portion 10 onto the primary drum 14, as well as at least one abrasion-proof element, depending on the construction process.

In the example shown, the primary drum 14 and the carcass structure 2a supported thereby, made in the form of a cylindrical sleeve, are picked up by a first transfer member, diagrammatically shown in FIG. 1 and denoted by arrow "T", which member carries out transfer of them to the assembling station 100 for engaging the primary drum 14 on shaping devices herein not shown as they can be made according to the disclosure of document WO 2010/064077 in the name of the same Applicant, for example.

The crown-structure building line 12 is equipped with at least one forming drum 18 usually also referred to as "auxiliary drum" that is adapted to be sequentially transferred between two or more work locations 19, 20, 21 dedicated to manufacture of the crown structure.

In greater detail, in a possible embodiment at least one first work location 19 is dedicated to formation of the belt layer or layers 8a, 8b, and/or to assembly of other components of the belt structure 8, according to a predetermined sequence. At least one second work location 20 can be designed for formation of the tread band 9 on the belt structure 8, at a radially external position. A third work location 21 can be provided for applying additional annular inserts, such as the under-belt inserts 8c and/or at least one portion of the sidewalls 10 in the continuation of the axially opposite edges of the tread band 9.

A possible second transfer member 22 movable from and to the main drum 14 associated with the aforesaid shaping devices, carries out transfer of the crown structure 8 from the forming drum 18 brought to the assembling station 100 too, to the carcass structure 2a, at a radially external position thereto (FIG. 1). In known manner, when the crown structure 8 is in a centred position relative to the carcass structure 2a, the latter is shaped in a toroidal configuration. The consequent radial expansion of the carcass ply/plies 3 leads the same to adhere against the inner surface of the crown structure 8, retained by the second transfer member 22.

Tyre 2 thus built can be removed from the primary drum 14 to be submitted to a vulcanisation treatment and/or other processing operations provided in the work cycle.

The forming drum 18 externally has a substantially cylindrical deposition surface, formed with a plurality of sectors 24 circumferentially distributed one after the other around a geometric rotation axis X of the forming drum.

To the aims of the present invention by "substantially cylindrical" deposition surface 23 it is intended a deposition surface the shape of which corresponds to a solid of revolution defined by a generatrix having rectilinear development or arched development, as can be viewed from the accompanying drawings.

Figure 3:
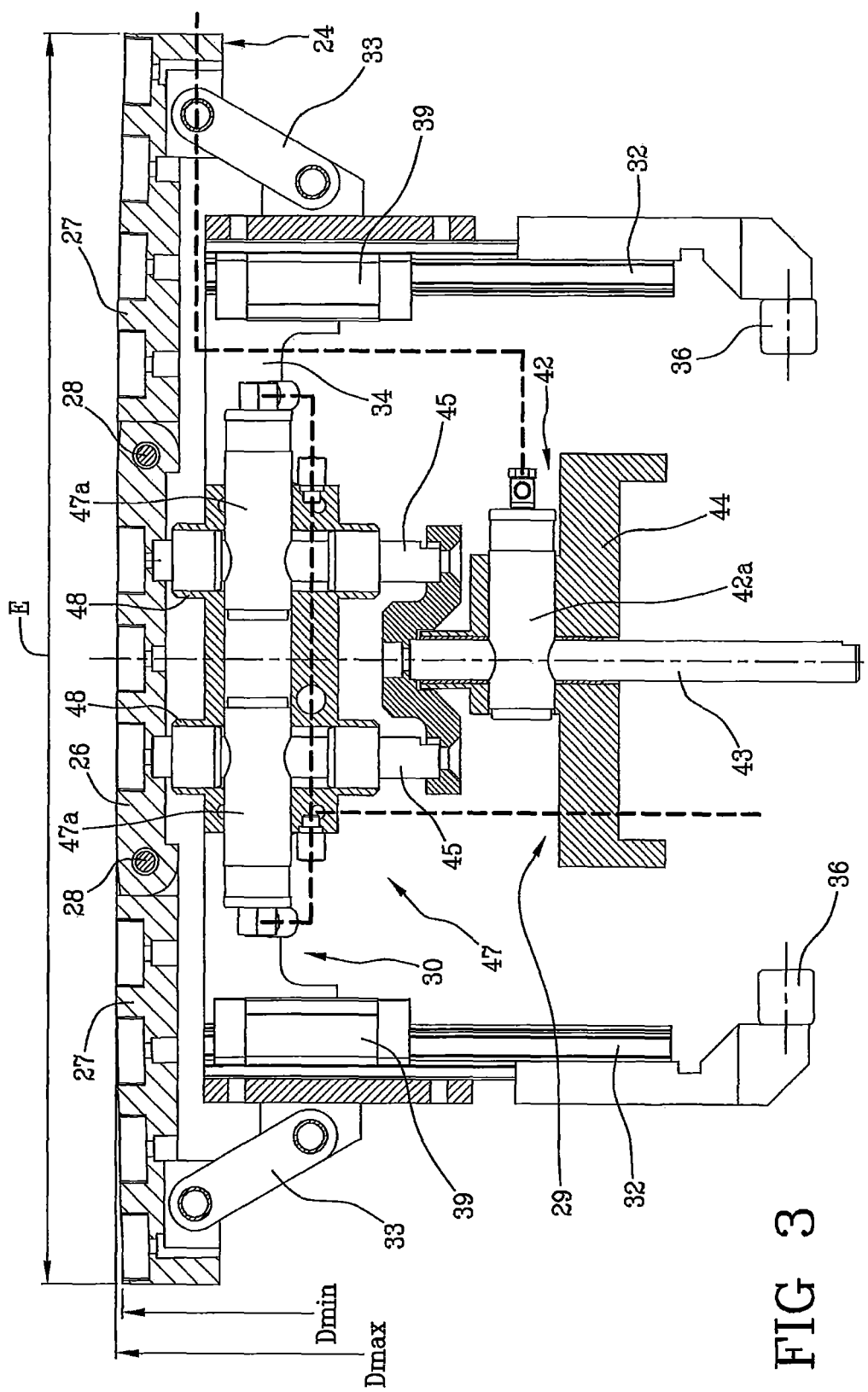
FIG. 3 shows a section of a construction detail taken at one of the circumferential sectors of the forming drum.
Figure 4:
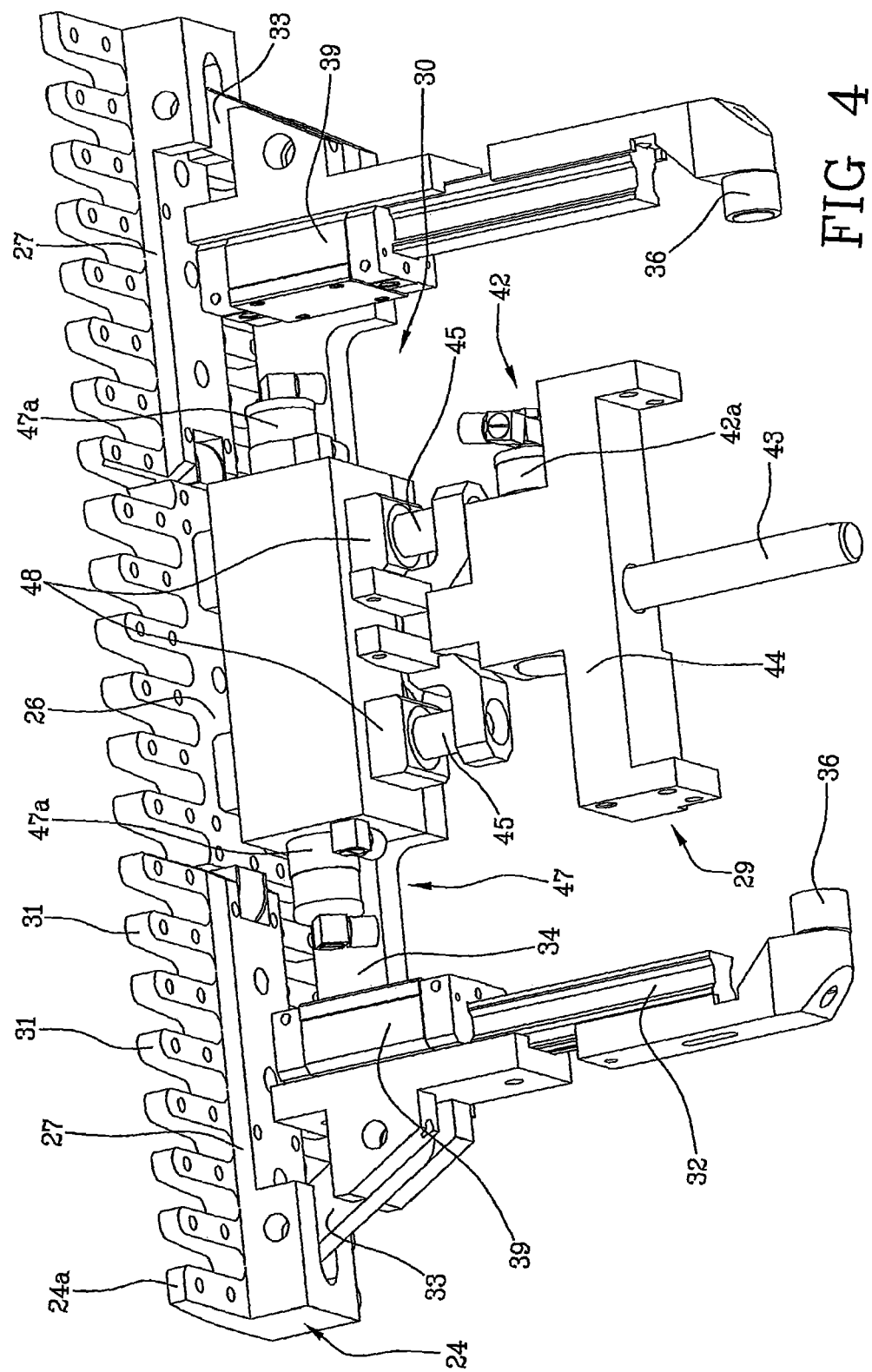
FIG. 4 shows the detail seen in FIG. 3 in a perspective view.
Figure 5:
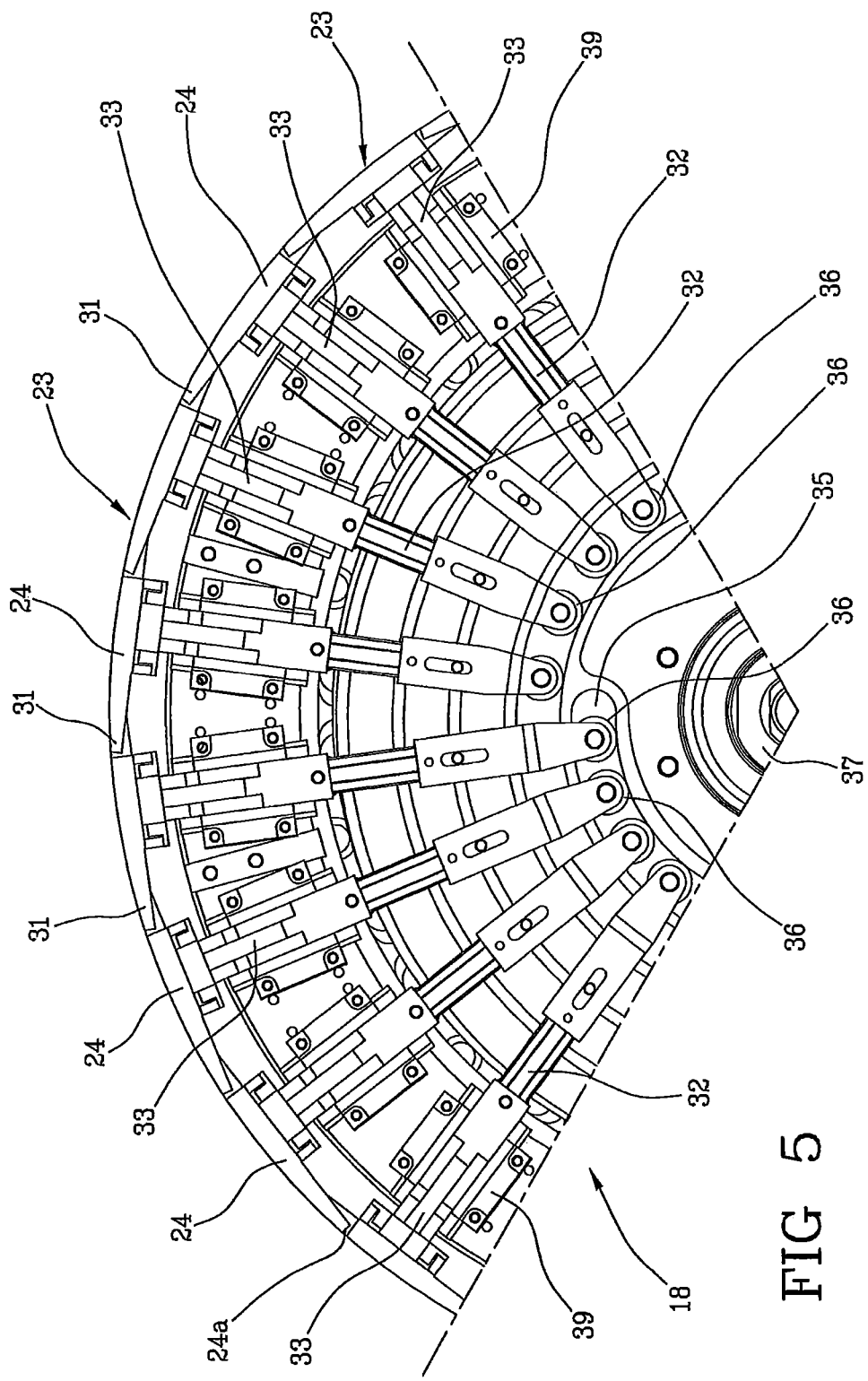
FIG. 5 shows a portion of the forming drum set to a diametrical maximum-contraction condition with some parts removed for better emphasising others.
Figure 6:
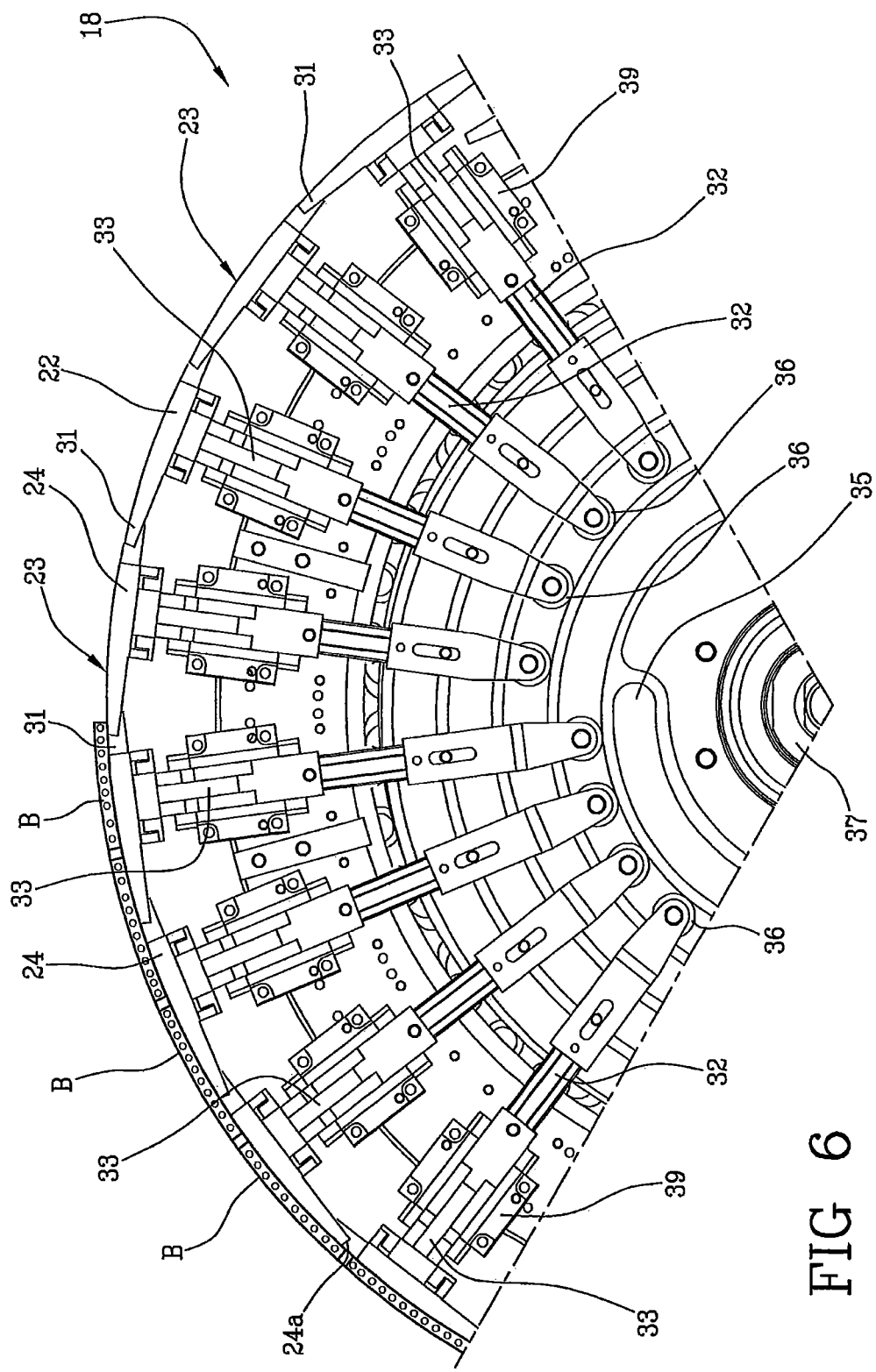
FIG. 6 shows the drum of FIG. 5 set to a possible deposition configuration.

In other words, along the development of each sector 24, in a radial-section plane relative to the geometric rotation axis X, it is possible to detect a curvature outline of the deposition surface 23. Preferably, this curvature outline is such that the difference between a maximum diameter Dmax measurable at a symmetry plane orthogonal to the geometric rotation axis X of the forming drum 18, and a minimum diameter Dmin findable at the axially opposite edges of the drum itself, is included between about 0 (cylindrical surface-straight curvature outline) and about 30% of the axial size E measurable between said axially opposite edges (FIG. 3).

In other words, the following relation is valid:

$$0 =< (D\max - D\min) =< 0.3 * E.$$

Associated with each forming drum 18 are setting devices 25 that can be preferably activated before starting manufacture of the first belt layer 8a on the forming drum 18, to set the deposition surface 23 in at least one predetermined deposition configuration.

In greater detail, the deposition surface 23 can be preferably set in several deposition configurations, each of which can be selected each time in accordance with the geometric and/or dimensional features of the tyre under production.

Each sector 24 to this aim comprises at least one central portion 26 and at least two end portions 27 axially external relative to the central portion 26 and extending in axially opposite directions relative to the latter. The end portions 27 are preferably hinged on the central portion 26, by hinging pins 28 for example that are in engagement with the respectively opposite ends of the central portion so as to be radially movable relative thereto.

In a possible variant not shown, each sector 24 can further comprise intermediate portions each secured between one of the end portions 27 and the central portion 26 so as to make sectors 24, if necessary, more adaptable to the required different curvature outlines.

The setting devices 25 essentially comprise radial-movement devices 29 to move sectors 24 so as to give the deposition surface 23 a predetermined diameter, which cooperate with relative-movement devices 30 for movement between the end portions and central portion of each sector relative to the geometric rotation axis, in order to shape the deposition surface into a predetermined curvature outline.

More particularly, the radial-movement devices 29 are adapted to simultaneously cause translation of sectors 24 in a direction radial to the geometric rotation axis X, so as to determine a variation in the diametrical sizes of the forming drum 18, starting from a maximum-contraction and minimum-curvature condition of the deposition surface 23, in which sectors 24 can act in mutual abutment by means of respective circumferential shoulders 24a so as to give the deposition surface 23 a continuous course.

The circumferential shoulders 24a of each sector 24 are preferably defined at respective comb-shaped end portions 31 each of which operatively engages a comb-shaped end portion 31 geometrically complementary thereto, carried by a circumferentially adjacent sector 24. In this manner, the deposition surface 23 advantageously keeps its substantially cylindrical conformation and a substantially continuous extension, i.e. without important discontinuities even following strong expansion of the forming drum 18. Thus the forming drum 18 can be easily adapted to processing of tyres with geometric and diametrical measures even greatly different from each other.

Each sector 24 is carried by at least one or, as shown, one pair of radial arms 32 preferably placed in the vicinity of respective axially opposite sides of the forming drum 18 and each operatively in engagement with one of the end portions 27 of the respective sector 24. In a preferred solution, rotatably secured to each radial arm 32 is an end of at least one connecting rod 33 the opposite end of which is hinged on the corresponding end portion 27 of sector 24. Preferably, a bridge portion 34 extends between the radial arms 32 and is rigidly engaged relative to the same, so as to mutually interconnect the end portions 27 of each sector 24.

At least one or, as shown, one pair of spiral-shaped cams 35 operatively engage sectors 24 at respective sliders 36 each carried by the respective end portion of each sector 27. More particularly, each slider 36 is preferably in engagement with one of said radial arms 32.

Each spiral-shaped cam 35 is fastened to a grip shank 37 coaxial with the geometric rotation axis X, and it engages the sliders 36 of the radial arms 32 disposes on the same side of the forming drum 18.

At least one or, as shown, one pair of guide flanges 38 support sectors 24 radially guiding them relative to the geometric rotation axis X by means of guide seats 39 slidably passed through by the respective radial arms 32. The guide flanges 38 are rotatably supported by the grip shank 37 by rolling bearings 40, and at least one of them can carry stop devices 41 to selectively enable and disable freedom of rotation of the guide flanges relative to the grip shank 37. Said stop devices 41 are not described in detail as they can be made following the description in document WO2008/152453 in the name of the same Applicant, for example.

The spiral-shaped cams 35 lend themselves to rotate together with the grip shank 37 relative to the guide flanges 38 and the circumferential sectors 24. Thus it is possible to determine a simultaneous radial movement of the circumferential sectors 24 and place them to a plurality of positions included between a maximum-contraction position and a maximum-expansion position.

Central-portion locking devices 42 operate on the central portion 26 of each sector 24 so as to lock it to a predetermined work position that can be selected as a function of the geometrical and/or dimensional features of the tyre being processed.

More particularly, the central-portion locking devices 42 preferably comprise first brakes 42a each operating between a rod 43 radial to the respective sector 24 and a first runner 44 slidably guided relative to rod 43. In a preferred embodiment the first runner 44 is fastened to the guide flanges 38 and is slidably passed through by rod 43 rigidly connected to the central portion 26 of the respective sector 24. In greater detail, formed on a radially external end portion of rod 43 is a pair of extensions 45, rigidly connected to the central portion 26 of the respective sector 24.

Each of the first brakes 42a, not shown in detail as they can be made in known manner, is operatively integrated into one of the first runners 44 and, under rest conditions, is pushed against the rod 43 by one or more spring members, to rigidly retain the central portion 26 of the respective sector 24. The first brakes 42a are further adapted to be simultaneously deactivated, pneumatically for example, by overcoming the action of the respective spring members, to free movement of rods 43 relative to the first runners 44, so as to enable radial movement of the central portions of sectors 24.

To this aim, the first brakes 42a can be connected to at least one first pneumatic-connection terminal 46 placed in the vicinity of the stop devices 40 for example, and laterally appearing from the forming drum 18.

Also provided are end-portion locking devices 47 operating on the end portions 27 of each sector 24 to lock them to a predetermined work position, selected from a plurality of positions included between a maximum-contraction position and a minimum-contraction position relative to the corresponding central portion 26.

In greater detail, to this aim second brakes 47a can be provided, each of which operates between one of rods 43 and a second runner 48 slidably guided relative to the rod itself. More particularly, in a preferred embodiment, a pair of second brakes 47a is provided for each sector 24, which brakes are each associated with one of the end portions 27 and preferably integrated into at least one respective second runner 48. Each second runner 48 is preferably fastened to the bridge structure 34 of the respective sector 24 and is slidably passed through by said extensions 45, radial to the respective sector 24.

Spring members push the second brakes 47a of each sector 24 against the respective extensions 45, so as to lock the bridge structure 34 and rigidly retain the end portions 27 of the respective sector 24. The second brakes 47a are further adapted to be simultaneously deactivated, pneumatically for example, by overcoming the action of the respective spring members, to make movement of the second runners 48 free along the extensions 45 so as to enable radial movement of the end portions 27 of sectors 24 relative to the central portions 26.

To this aim, the second brakes 47a can be connected to at least one second pneumatic-connection terminal 49 located at an end of the grip shank 37 for example, which is therefore provided with at least one inner pipeline 50.

Operating in the crown-structure building line 12 is at least one handling device 51 preferably comprising a preferably anthropomorphic robotized arm, of the type provided with six or more movement axes, movable between the first and second work locations 19, 20 and/or other locations provided in the crown-structure building line 12. The handling device 51 can be removably coupled to the forming drum 18 to transfer it between the work locations 19, 20, 21 provided in the crown-structure building line 12, and it forms an integral part of the setting devices 25 being operatively coupled to the radial-movement devices 29 and/or the relative-movement devices 30.

More particularly, the handling device 51 engages the forming drum 18 at an end of the grip shank 37, preferably opposite to the second pneumatic-connection terminal and can operate on the latter to drive along in rotation the spiral-shaped cams 35 relative to the guide flanges 38. The handling device 51 can further be operatively coupled with the central-portion locking devices 42, by at least one first quick-fit pneumatic connection 52 for example, that can be operatively coupled with the first pneumatic-connection terminal 46, through which introduction of compressed air to the brakes 42a can be caused to determine deactivation thereof.

Control devices 53 that can be operatively coupled to the end-portion locking devices 47 can be provided in a setting location 54 operating along the crown-structure building line 12 to receive each forming drum 18 for carrying out setting of the deposition surface 23 according to the desired deposition configuration.

These control devices 53 may for example comprise at least one second quick-fit pneumatic connection to be operatively coupled with the second pneumatic-connection terminal 49 through which introduction of compressed air to the second brakes 47a can be caused to determine deactivation of the latter.

In accordance with a building process according to the invention, for manufacture of the crown structures 7, the forming drum 18 for instance picked up from the assembling station 100 by the handling device 51 at the end of building of a tyre, is provided to be engaged in the setting location 54 at which connection of the second brakes 47a to a compressed-air feeding line is enabled, following coupling of the second quick-fit pneumatic connection 53 with the second pneumatic-connection terminal 49.

Selection devices not shown, comprising a programmable governing unit supervising operation of the crown-structure building line 12 and possibly of other parts of plant 1, carries out selection of a first deposition configuration to be given to the deposition surface 23 selected as a function of the previously stored type of tyre being processed.

The forming drum 18 at least partly contracted due to removal of the previously formed crown structure 7, can be, if necessary, submitted to a preliminary operation for initialising the position of sectors 24, implementing the maximum-contraction and minimum-curvature condition of the deposition surface 23. To this aim, the handling device 51 acts on the grip shank 37 to drive the spiral-shaped cams 15 in rotation so as to bring back the end portions 27, if necessary, to the minimum-contraction position relative to the central portions 26. This action is carried out after deactivation of the second brakes 47a by introduction of compressed air through the second pneumatic-connection terminal 49, while the first brakes 42a remain active on the respective rods 43 to retain the central portions 26 during actuation of the spiral-shaped cams 35.

When the end portions 27 have reached to minimum-contraction position, deactivation of the first brakes 42a through the first pneumatic-connection terminal 46 is produced, concurrently with activation of the second brakes 47a. The handling device 51 then rotates the grip shank 37, if necessary, in the opposite direction relative to the preceding action, to bring the central portions 26 of sectors 24 back to the maximum-contraction position. The end portions 27, locked upon the action of the second brakes 47a, follow the central portions 26 in their motion of approaching the geometric rotation axis X.

When the above described possible initialising operation has been completed, the forming drum 18 is submitted to setting of the deposition surface 23 to the first deposition configuration.

To this aim, while the first brakes 42a are maintained inactive and the second brakes 47a are maintained active, the handling device 51 acts on the grip shank 37 to determine radial expansion of the deposition surface 23, until sectors 24 reach a work position corresponding to a predetermined diameter of the deposition surface 23.

If the minimum-contraction position maintained by the end portions 27 were not already in accordance with the desired curvature outline to be given to the deposition surface 23, the spiral-shaped cams 35 can be driven in rotation in the opposite way relative to the preceding action, concurrently with deactivation of the second brakes 47a or re-activation of the first brakes 42a for locking the central portions 26 relative to the geometric rotation axis X. Thus a relative movement between the central portion 26 and the axially external end portions 27 of each sector 24 is carried out to shape the deposition surface 23 according to a predetermined curvature outline. More particularly, the end portions 27 move towards the geometric rotation axis X rotating around the respective hinging pins 28, so as to progressively increase the curvature outline of the deposition surface 23 until the desired value is reached.

Therefore the forming drum 18 has a diameter and a curvature outline that can be modulated in a manner independent of each other, to prepare the deposition surface 23 to process tyres geometrically different from each other.

When the desired deposition configuration has been reached, the handling device 51 can remove the forming drum 18 from the setting location 54 for proceeding with building of the crown structure 7.

The action of the first and second brakes 42a, 47a ensures that the desired deposition configuration is maintained during the processing operations and the transfer actions of the forming drum 18 between the work locations 19, 20, 21, until the end of the process. Possible modifications of the forming drum diameter during the process for manufacturing the crown structure 7, if required, can be at all events carried out through actuation of the radial-movement devices 29 upon command of the handling device 51, after deactivation of the first brakes 42a.

In greater detail, the handling device 51 is adapted to retain the grip shank 37 to transfer the forming drum 18 to the first work location 19, at which at least one belt layer 8a, 8b or other component of the crown structure 7 is produced by means of applicator devices 55 preferably provided for depositing a plurality of strip-like elements B in circumferential side by side relationship on the forming drum 18.

Said applicator devices 55, not described in detail for clearness of exposition, can be accomplished following the description of U.S. Pat. No. 6,702,913 in the name of the same Applicant, for example.

The handling device 51 carries out appropriate positioning of the forming drum 18 at the applicator devices 55 and drives it in rotation, for example in a step-by-step movement, in timed relationship with deposition of the individual strip-like elements B on the deposition surface 23, so that said strip-like elements are applied in succession one adjacent to the other, each according to an orientation parallel to or suitably inclined relative to the geometric rotation axis X, until they cover the whole circumferential extension of the deposition surface 23.

At least one second belt layer 8b can be formed at a position radially external to the first belt layer 8a, in the same manner as previously described but with the strip-like elements B preferably extending in a crossed orientation relative to those of the first belt layer 8a. During manufacture of the second belt layer 8b, the deposition surface 23 of the forming drum 18 will be represented by the previously formed first belt layer 8a.

Before and/or after manufacture of the belt layer/s 8a, 8b, at least one annular insert of elastomeric material can be formed around the deposition surface 23.

Said at least one annular insert may consist for example of part of the tread band 9, applied at a radially external position to the first and/or second belt layer 8a, 8b, and/or at least part of the sidewalls 10, each extending on the deposition surface 23, axially beyond the edges of said first and/or second belt layer 8a, 8b. One or more annular inserts of elastomeric material can also form the under-belt inserts 8c, applied onto the deposition surface 23 at a position radially internal to the axially opposite edges of the belt layers 8a, 8b.

Each annular insert can be advantageously made by spiralling at least one continuous elongated element of elastomeric material, i.e. by winding said continuous elongated element into substantially circumferential turns that are disposed in mutual side by side relationship around the deposition surface 23.

To this aim, the second and/or third work location 20, 21 can comprise at least one delivery device 56, such as an extrusion die for example, distributing the continuous elongated element on the forming drum 18, while the latter is being driven in rotation around its geometric rotation axis X through the handling device 51, and conveniently moved by the latter to determine distribution of the turns in a manner adapted to give a desired final conformation to the under-belt inserts 8c, the tread band 9, and/or the sidewalls 10 being produced.

At least formation of the under-belt inserts 8c should have to be preferably carried out before setting of the deposition surface 23 to the desired deposition configuration, i.e. with the deposition surface in the maximum-contraction and minimum-curvature condition to which mutual contact of sectors 24 in surface continuity relationship corresponds. Thus it is possible to eliminate the risk that the continuous elongated element applied directly in contact with the forming drum 18, may break during winding by effect of anomalous stresses caused by undesirable surface discontinuities of the forming drum 18.

To this aim, the handling device 51 can carry out transfer of the forming drum 18 from the setting position 54 to the second and/or third work location 20, 21 after the initialising operation.

When application of the under-belt inserts 8c and/or possible other elements radially internal to the belt layers 8a, 8b has been completed, the forming drum 18 can be transferred again to the setting location 54 to be set to the desired deposition configuration. When setting is over, the handling device 51 transfers the forming drum 18 from the setting location 54 to the first work location 19 to form the belt layer or layers 8a, 8b. Subsequently the handling device 51 can carry out transfer of the forming drum 18 from the first work location 19 to the second and/or third work location 20, 21, to determine formation of the tread band 9 and of at least one portion of the sidewalls 10.

When manufacture of the crown structure 7 has been completed, the handling device 51 can transfer the forming drum to the assembling station 100, to enable engagement of the crown structure 7 by the second transfer member 22. Following radial contraction of sectors 24 of the forming drum 18, after unlocking of the first brakes 42a, the forming drum 18 can be axially slipped off and disengaged from the crown structure 7 and be transferred again to the crown-structure building line 12 for starting manufacture of a new crown structure 7.

If required, the forming drum 18 can be engaged again in the setting location 54, before starting formation of a new crown structure 7 for setting the deposition surface 23 to a second deposition configuration or bringing back the deposition surface 23 to the maximum-contraction and minimum-curvature condition before forming the under-belt inserts 8c designed to build a new crown structure 7. Alternatively, the forming drum 18 can be directly transferred to one of the first, second or third work location 19, 20, 21, in particular if the geometrical and dimensional features of the new crown structure 7 do not require modifications in the shape of the deposition surface 23.

The crown-structure building line 12 can be advantageously equipped with several forming drums, at least one first and one second forming drums 18a, 18b, for example, to enable simultaneous processing of several crown structures 7.

Each of the forming drums 18, the first forming drum 18a for example, can be advantageously decoupled from the handling device 51 before formation of the crown structure 7 on the first forming drum 18 itself has been completed, to enable it to be conveniently engaged, supported and moved in the first, second and/or third work location 19, 20, 21, by a second robotized arm or device of other type (not shown), for example, so as to form one or more of the corresponding components of the crown structure 7. Thus the handling device 51 decoupled from the first forming drum 18a will be available for engaging the second forming drum 18a so as to start formation of a new crown structure 7.

The handling device 51 itself will be in a position to be coupled with the first forming drum 18a again, to start a new work cycle and possibly set the deposition surface 23 of the first forming drum itself to a new deposition configuration.

The invention claimed is:

1. A process for building tyres for vehicle wheels, comprising:
    making carcass structures;
    making crown structures; and
    associating each carcass structure with each crown structure, wherein making said crown structures comprises:

providing at least one first forming drum having a deposition surface and comprising sectors radially movable relative to a geometric rotation axis and circumferentially distributed one after the other;

setting the deposition surface to a first deposition configuration; and depositing strip-like elements in circumferential side by side relationship on the deposition surface set in the first deposition configuration, so as to form at least one component of at least one first crown structure, wherein setting said deposition surface to a first deposition configuration, comprises:

radially moving said sectors to give the deposition surface a predetermined diameter; and carrying out a relative movement between a central portion and axially external end portions of each sector to shape the deposition surface into a predetermined convex outline;

wherein carrying out of said relative movement comprises:

locking the central portion of each sector relative to the geometric rotation axis using a first locking device;

moving the end portions of each sector relative to the geometric rotation axis through respective sliders carried by radial arms that are engaged with the end portions of each sector; and wherein radially moving said sectors is also performed through the sliders with the central portion of each sector unlocked relative to the geometric rotation axis by the first locking device and with the end portions of each sector locked relative to the respective central portions of each sector using a second locking device.

2. The process as claimed in claim 1, further comprising:

coupling said at least one first forming drum to a handling device and activating the handling device for setting the deposition surface to the first deposition configuration; and decoupling said at least one first forming drum from the handling device before completing formation of the first crown structure.

3. The process as claimed in claim 2, further comprising coupling said at least one first forming drum again to the handling device and activating the handling device for setting the deposition surface to a second deposition configuration.

4. The process as claimed in claim 3, wherein the handling device decoupled from said at least one first forming drum is coupled to at least one second forming drum.

5. The process as claimed in claim 4, wherein coupling of the handling device to said at least one second forming drum is carried out before coupling said at least one first forming drum again to the handling device.

6. The process as claimed in claim 2, wherein transfer of said at least one first forming drum from a first work location to a second work location is carried out by said handling device.

7. The process as claimed in claim 2, wherein at least one component of said at least one first crown structure is made on said at least one first forming drum decoupled from the handling device.

8. The process as claimed in claim 1, further comprising at least transfer of said at least one first forming drum from a first work location to at least one second work location.

9. The process as claimed in claim 8, further comprising locking the deposition surface to the first deposition configuration during transfer of said at least one first forming drum.

10. The process as claimed in claim 8, wherein at least one component of the crown structure is made on said at least one first forming drum transferred to said at least one second work location.

11. The process as claimed in claim 1, wherein during said relative movement, the end portions of each sector are moved toward the geometric rotation axis.

12. The process as claimed in claim 1, wherein the radial movement of the sectors is carried out by driving at least one spiral-shaped cam in rotation around said geometric rotation axis.

13. The process as claimed in claim 1, comprising:

removing said at least one component of at least one first crown structure from said at least one first forming drum;

setting the deposition surface to a second deposition configuration; and forming at least one component of at least one second crown structure on the deposition surface.

14. The process as claimed in claim 1, wherein said at least one component of said at least one first crown structure formed through deposition of strip-like elements in circumferential side by side relationship is a belt layer.

* * * * *